Patented July 11, 1933

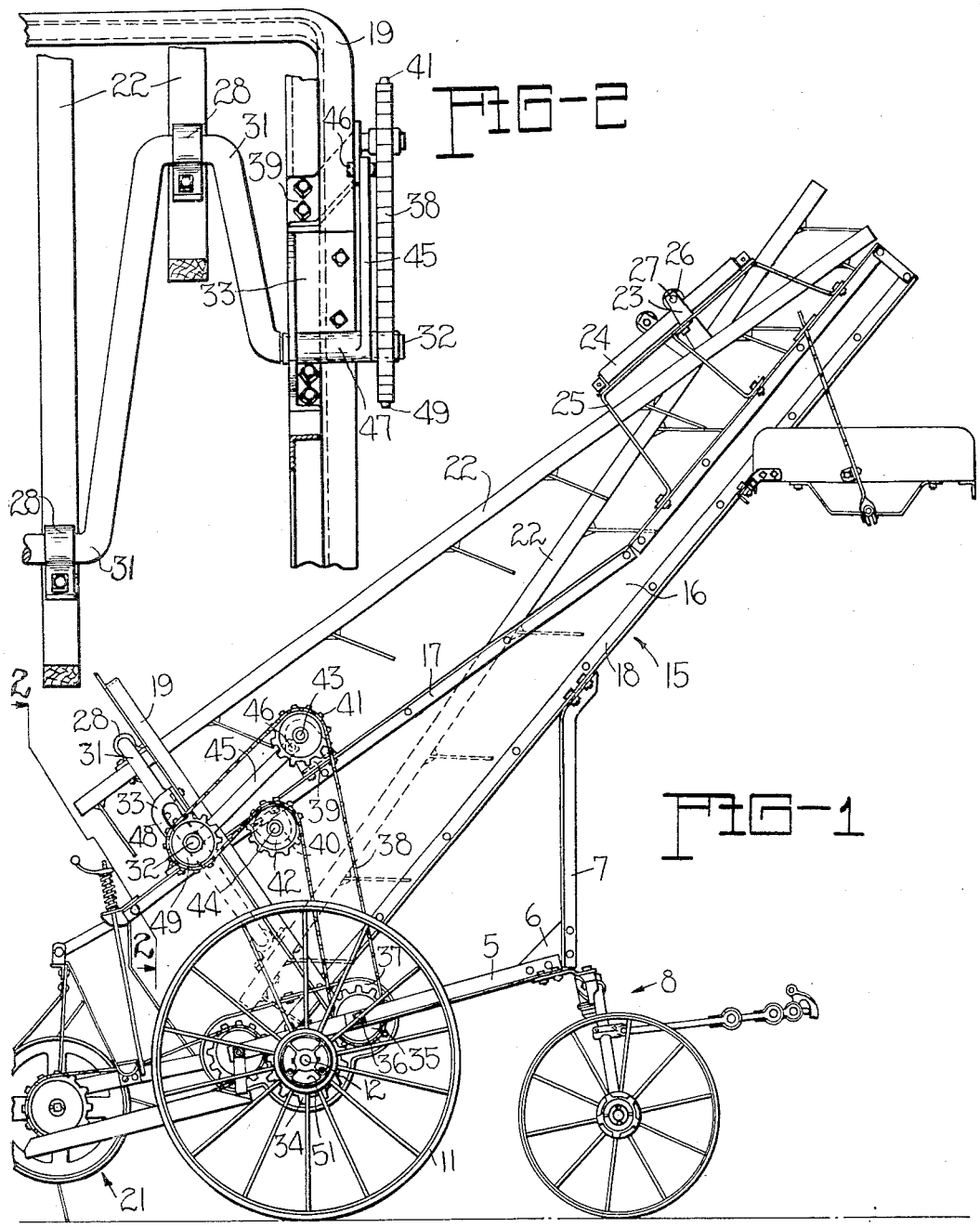

1,917,765

UNITED STATES PATENT OFFICE

JAMES E. HURLEY, OF SIOUX CITY, IOWA, ASSIGNOR TO DAIN MANUFACTURING COMPANY OF IOWA, OF OTTUMWA, IOWA, A CORPORATION OF IOWA

HAY LOADER

Application filed December 26, 1931. Serial No. 583,309.

My invention relates to hay loaders and particularly to the raker bar type in which the lower end of the raker bars are supported on and actuated by a transversely extending crank shaft.

The main object of my invention is to provide, in a hay loader of the above type, a means for floatingly supporting the crank shaft.

Other objects and advantages of my invention will be apparent to those skilled in the art after a consideration of the following detailed description, taken in conjunction with the accompanying drawing wherein:

Figure 1 illustrates a side elevational view of a combination cylinder and raker bar loader embodying the novel supporting means for the crank shaft; and, Figure 2 is an enlarged detail view taken on the plane of line 2—2 of Figure 1 and illustrating a portion of the implement including the improved means for supporting the crank shaft.

The hay loader includes a frame comprising a pair of substantially horizontally disposed bars 5 which converge forwardly and are secured at their forward ends to a gusset plate 6, and a pair of vertically disposed bars 7 secured at their lower end to the gusset plate 6 and diverging laterally therefrom. A conventional tongue truck 8 is attached to the gusset plate 6 and supports the front end of the frame. The rear end of the frame is supported on wheels 11 journaled on the ends of an axle 12 which extends transversely of the bars 5 adjacent their rear end. The wheels 11 also serve as drive wheels for operating the moving parts of the loader.

The elevator frame 15 is supported on the bars 5 and 7 and comprises a bottom sheet or deck having an upstanding side sheet 16 secured at each side thereof. Upper and lower angle iron members 17 and 18 are secured to the upper and lower edges, respectively, of each side sheet and serve to reinforce same. An arch member 19 is disposed transversely of the deck adjacent the lower end thereof and is secured to the angle iron members 17 and 18. A raking cylinder 21 is mounted rearwardly of the elevator frame in a conventional manner and serves to deliver the hay to the deck. A plurality of raker bars 22 are mounted above the deck of the elevator frame 15 and are adapted to engage the hay and advance it upwardly along the elevator. A yoke-shaped bracket 23 is secured to each raker bar, adjacent the upper end thereof, and each yoke extends upwardly and embraces a longitudinally disposed rail 24. The rails 24, one of which is provided for each yoke, are supported in a frame 25 which extends transversely of the elevator frame 15 and is secured thereto. A sheave 26 is journaled on a pin 27 extending transversely between the free ends of each yoke 23, and contacts with the upper surface of the respective rail upon which it rolls when the raker bars are oscillated. A bearing bracket 28 is secured on each raker bar adjacent the lower end thereof and a crank portion 31 of a transversely extending crank shaft 32 is journaled in each bearing bracket. The crank shaft 32 is supported at each end in a bracket 33 which is secured to the adjacent vertical leg of the arch member 19. The crank shaft 32 is floatingly mounted so as to rise and fall proportionate with the varying quantities of hay as will be described later.

The crank shaft 32 is driven by power derived from the drive wheels 11 by means of driving connections extending therebetween. Since the drive at each side of the implement is identical, the description of one drive will suffice. A spur gear 34 is secured to the axle 12 and meshes with a spur gear 35 supported on a spindle 36 which is mounted on the bar 5 of the loader frame. A sprocket 37 is formed integral with the gear 35 and engages an endless link chain 38. Brackets 39 and 40 are secure in spaced relation on the angle iron member 17 and extend upwardly and downwardly therefrom, respectively. Sprockets 41 and 42 are mounted on spindles 43 and 44 which extend laterally from the brackets 39 and 40. These sprockets 41 and 42 serve as idlers to support the link chain 38. An arm 45 is pivoted at 46 on the bracket 39 adjacent the spindle 43 and extends rearwardly therefrom. A bearing sleeve 47 is formed on the rear end of the arm 45 and extends inwardly therefrom and forms a bearing for the end of the crank shaft 32. The sleeve 47 extends into a slot 48 in the bracket 33, the slot 48 being slightly curved concentric with the pivot 46. A sprocket 49 is fixed on the end of the crank shaft 32 and the endless drive chain 38 engages therewith to drive same. The axle 12 is rotated through the drum 51 which is secured at each end thereof and has a ratchet engagement with the wheel 11. The ratchet mechanism is conventional and since it does not effect the invention, it will not be described in detail.

In the operation of this type of hay loader the hay is picked up by the raking cylinder and is delivered to the deck of the elevator frame where it is engaged by the raker bars. As previously stated the raker bars are oscillated by means of the crank shaft and serve to advance the hay along the deck to the point of delivery at the upper end where it is discharged into a truck or wagon. Because of varying conditions the quantity of hay frequently varies in different parts of the field and if the raker bars are permanently positioned so as to function properly in the light section of the field, a choking occurs when in the heavy section imposing undue strains upon the parts. By permitting the crank shaft to float in the manner described, the raker bars rise and fall with the varying quantities of hay and are, therefore, always in the proper spaced relation relative to the elevator deck to function properly. It will be readily apparent that as the quantity of hay increases the raker bars rise causing the crank shaft to move upwardly in the slot and as the quantity of hay decreases, the raker bars fall accordingly maintaining the same pressure upon the hay.

In my improved construction the crank shaft 32 has bearing contact in the sleeves 47. The sleeves 47 are of sufficient length so as to extend into the slot 48 of the adjacent bracket 33 and are held out of contact with the sides of the slot 48 by the arm 45 so as to prevent undue wear at this point. As previously stated the slot 48 is slightly curved concentric with the pivot point 46 of the arm 45 so as to permit movement of the sleeve 47. If the slot is made with sufficient clearance it may be made straight. It will be readily apparent that with this floating crank shaft the raker bars will automatically adjust themselves to a varying quantity of hay and will function properly without manual adjustment.

While I have described in connection with the accompanying drawing the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. In a hay loader, a plurality of raker bars, a transversely disposed crank shaft supporting the lower ends of said raker bars, means for floatingly supporting the crank shaft for limited vertical movement, and means for rotating said crank shaft in all its positions.

2. In a hay loader, an elevator frame, a plurality of raker bars above said frame, a transversely disposed crank shaft supporting the lower ends of said raker bars, a supporting bracket secured to each side of the frame, a slot in each bracket in which the ends of said crank shaft are supported, said crank shaft being movable vertically within the limits of said slot, and means for rotating said crank shaft in all its positions.

3. In a hay loader, an elevator frame, a plurality of raker bars above said frame, a transversely disposed crank shaft supporting the lower ends of said raker bars, an arm at each side of the frame pivotally connected thereto at one end and having a bearing at the other end in which said crank shaft is journaled, said crank shaft thereby having vertical movement with respect to said frame, and means for rotating said crank shaft in all its positions.

4. In a hay loader, an elevator frame, supporting wheels at each side of said frame, a plurality of raker bars above said frame, a transversely disposed crank shaft supporting the lower ends of said raker bars, a supporting bracket secured to each side of the frame, a slot in each of said brackets through which the ends of the said crank shaft extend, a bearing journaled on each end of the crank shaft, a driving sprocket adapted to engage with a supporting wheel, a pair of spaced brackets secured to the elevator frame, an idler sprocket mounted on each of said brackets, a driven sprocket secured at the end of the crank shaft, a drive chain trained over these sprockets, and an arm pivotally mounted on one of the idler sprocket brackets and secured to the said bearing.

5. In a hay loader, an elevator frame, supporting wheels at each side of said frame, a plurality of raker bars above said frame, a transversely disposed crank shaft supporting the lower ends of said raker bars, a supporting bracket secured to each side of the frame, a slot in each of said brackets, a bearing journaled on each end of the crank shaft and floatingly positioned within the slot of the supporting bracket, a drive chain operated by the supporting wheel and driving the crank shaft, and an arm secured to said sleeve and pivotally connected to the elevator frame to hold the sleeve out of binding contact with the sides of the slot.

JAMES E. HURLEY.